3,132,116
ORGANOCYANOALKYLSILOXANE POLYMER COMPOSITIONS CONTAINING POWDERED POLYTETRAFLUOROETHYLENE
Edward V. Wilkus, Albany, N.Y., assignor to General Electric Company, a corporation of New York
No Drawing. Filed May 31, 1962, Ser. No. 198,745
3 Claims. (Cl. 260—41)

The present invention relates to organopolysiloxane compositions convertible to oil resistant organopolysiloxane elastomers. More particularly, the present invention relates to a method for making uniform mixtures comprising a silicone polymer consisting essentially of chemically combined diorganosiloxane units and organocyanoalkylsiloxane units, and a minor amount of polytetrafluoroethylene, and to improved elastomers derived therefrom.

The development of organocyanoalkyldihalosilanes as shown in Bluestein Patent 2,971,971, provided for the production of a variety of improved oil resistant organopolysiloxane products. Although the presence of chemically combined organocyanoalkylsiloxane units in organopolysiloxane polymers convertible to the cured, solid, elastic state, imparts improved oil resistance to elastomers derived therefrom, it is generally known to those skilled in the art that such polymers are also extremely tacky materials. As a result, methods employed for converting conventional organopolysiloxane polymers to the cured, solid, elastic state are economically less attractive when utilizing organopolysiloxane polymers having chemically combined organocyanoalkylsiloxane units. For example, when blending on a rubber mill, or in conventional rubber mixing equipment various materials, such as filler, curing agent, etc. with an organopolysiloxane polymer convertible to the cured, solid, elastic state having chemically combined organocyanoalkylsiloxane units, it is difficult to uniformly blend the ingredients into the polymer. It is also difficult to form the blended mixture into useful shapes such as sheets or slabs, as it adheres to the processing equipment. A film of the polymer or mixture derived therefrom is invariably retained on the surface of the equipment. It becomes economically unattractive to blend other polymers with mixing equipment that has been used to blend polymers having chemically combined organocyanoalkylsiloxane units, because the latter polymers have to be scraped off the equipment to avoid contamination. It would be desirable therefore, to be able to blend organopolysiloxane polymers having chemically combined organocyanoalkylsiloxane units in an economic, and desirable manner with various materials by use of conventional mixing equipment, while providing for the production of organopolysiloxane elastomers having improved oil resistance.

It has now been discovered that if a silicone polymer convertible to the cured, solid, elastic state consisting of chemically combined organocyanoalkylsiloxane units and diorganosiloxane units is blended with filler and other conventional ingredients in the presence of a minor amount of a tetrafluoroethylene polymer, the characteristic tackiness of the blended mixture is dramatically reduced. In addition, the properties of elastomers derived therefrom are improved, compared to elastomers derived from such mixtures free of polytetrafluoroethylene.

In accordance with the present invention there is provided an organopolysiloxane composition convertible to the cured, solid, elastic state comprising by weight, (A) 100 parts of a silicone polymer having a viscosity of at least 100,000 centipoises at 25° C. and consisting essentially of chemically combined units of the formula (1) 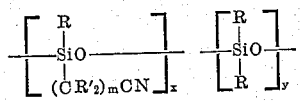

(B) from 0.1 to 10 parts of polytetrafluoroethylene, (C) from 10 to 200 parts of a filler, where the sum of $x$ and $y$ is greater than 1,000, and $x/y$ can have a value greater than 0.01 and preferably between about 0.05 to 1.5, R is a member selected from monovalent hydrocarbon radicals and halogenated monovalent hydrocarbon radicals, R' is a member selected from hydrogen and alkyl radicals having from 1 to 8 carbon atoms, and $m$ is an integer equal to from 2 to 5, inclusive.

Radicals included by R of Formula 1 are phenyl, chlorophenyl, xylyl, tolyl, etc.; aralkyl radicals such as phenylethyl, benzyl, etc., aliphatic, haloaliphatic, and cycloaliphatic radicals, such as alkyl, alkenyl, cycloalkyl, haloalkyl, including methyl, ethyl, propyl, chlorobutyl, cyclohexyl, etc.; radicals included by R' are hydrogen and alkyl radicals such as methyl, ethyl, pentyl, octyl, etc. R and R' separately, can be all the same radical, or any two or more of the aforementioned radicals, while R is preferably methyl, and R' is preferably hydrogen.

The silicone polymers of Formula 1 can have a viscosity at 25° C. of from 100,000 centipoises to as high as 40,000,000 centipoises or higher. These materials can be composed of from 1 mole to 100 moles of organocyanoalkylsiloxane units chemically combined with from 99 moles to 0 mole of diorganosiloxane units. It is preferred to have at least 5 moles to about 60 moles of chemically combined organocyanoalkylsiloxane units per 100 moles of chemically combined units in the polymer. One method that can be employed to make the polymers of Formula 1 is shown by Bluestein Patent 2,971,971. Another method involves the cohydrolysis of an organocyanoalkyldihalosilane and a diorganodihalosilane having the formula (2) 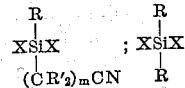

and the equilibration of the resulting cohydrolyzate after it has been heated to a temperature in the range between 70° C. to 120° C., where R, R' and $m$ are as defined above, and X is a halogen radical such as chloro or bromo. In addition, the product obtained by hydrolyzing the silanes of Formula 2 and further heating the cohydrolyzate, can be further equilibrated with organopolysiloxanes such as octamethylcyclotetrasiloxane and hexamethyldisiloxane, etc. Chain-stopping units, such as trimethylsiloxy, i.e., trimethylsiloxy, dimethylvinylsiloxy, etc., silanol, and alkoxy, i.e., methoxy, ethoxy, etc. can be utilized in a range from about 0.001 to 0.5 mol percent based on the total moles of siloxy units in the polymer. The equilibration of the various chemically combined units present in the polymer of Formula 1 can be performed in the presence of from 0.001 to 0.1 percent of a basic catalyst such as potassium hydroxide and at a temperature in the range of from 125° C. to 175° C.

Included by the organocyanoalkyldihalosilanes of Formula 2 are methyl-beta-cyanoethyldichlorosilane, methyl-gamma-cyanopropyldichlorosilane, ethyl-beta-cyanoethyldichlorosilane, etc. Typical examples of the dihalosilanes of Formula 2 are dimethyldichlorosilane, methylphenyldichlorosilane, methylvinyldichlorosilane, etc.

The polytetrafluoroethylene employed in the practice of the present invention to make the organopolysiloxane compositions convertible to improved oil resistant elastomers is in the form of powder having particle sizes ranging from about 0.5 to 500 microns or more. Dispersions of such particles, for example, aqueous dispersions, are also operable. Such material is more particularly described by Safford et al., Patent 2,710,290, who teach that polytetrafluoroethylene can be employed with conventional organopolysiloxane polymers having organic radicals in the form of monovalent hydrocarbon radicals attached to silicon through carbon-silicon linkages to form organopolysiloxane compositions convertible to elastomers having improved tear strength.

The fillers that can be employed in the practice of the invention to produce the organopolysiloxane compositions convertible to improved oil resistant elastomers are known to the art as reinforcing and semi-reinforcing fillers. The reinforcing fillers, such as the silica fillers, including fume silica, precipitated silica and the like are structure inducing and depending on the manufacture can contain or be free of hydroxyl groups. The preferred silica filler of the present invention is a fume silica filler made by fuming processes including the vapor phase burning of silicon tetrachloride or ethyl silicate, an example being what is known to the trade as Cab-O-Sil. Examples of other silica reinforcing fillers can be found described in U.S. Patents 2,541,137, 2,610,167 and 2,657,149. Examples of semi-reinforcing or non-structural forming type fillers are titanium oxide, lithopone, calcium carbonate, iron oxide, and diatomaceous earth. In addition to fillers, curing catalysts are also employed in the organopolysiloxane compositions of the present invention for the purpose of converting the compositions to the cured, solid, elastic state. For example, benzoyl peroxide, dicumyl peroxide, tetriary butyl perbenzoate, zirconyl nitrate, boron hydrides, etc. can be utilized in amounts ranging from 0.1 to 8 parts per 100 parts of copolymer.

In the practice of the invention, the organopolysiloxane compositions can be formed by mixing together the polymer consisting essentially of chemically combined organocyanosiloxane units and diorganosiloxane units, referred to hereinafter as the "silicone polymer," the filler, the polytetrafluoroethylene, along with a curing catalyst, etc. The order of addition of the various ingredients used in forming the organopolysiloxane compositions is not critical. One procedure, for example, is to add the filler to the silicone polymer along with, or separately from, the polytetrafluoroethylene, while the silicone polymer is being mixed such as on a standard rubber mill, doughmixer and the like. A preferred procedure is to initially add a small amount of filler to the silicone polymer prior to the addition of polytetrafluoroethylene.

Mixing of the various ingredients can be continued until the polyetetrafluoroethylene is uniformly dispersed throughout the filler-silicone polymer mixture. After the addition of the curing catalyst, the resulting organopolysiloxane composition can then be initially cured at temperatures of 120° C. to 175° C. and then post-cured at temperatures of 100° C. to 275° C.

In order that those skilled in the art may be better able to practice the present invention, the following examples are given by way of illustration and not by way of limitation. All parts are by weight.

A silicone polymer of methyl-beta-cyanoethylsiloxy units and dimethylsiloxy units was prepared by hydrolyzing a mixture of 49.4 moles of dimethyldichlorosilane, 50 moles of methyl-beta-cyanoethyldichlorosilane and 0.6 mole of methylvinyldichlorosilane in 500 moles of water and an equal part by weight of toluene. The organic layer was recovered and stripped at a temperature between about 70° C. to 120° C. The cohydrolyzate was then heated in the presence of about .01 percent potassium hydroxide at a temperature in the range of 125° C. to 175° C. until a polymer having a viscosity of about 1,000,000 centipoises at 25° C. was obtained.

EXAMPLE 1

There was added to 100 parts of the abovedescribed silicone polymer, while it was milled on a rubber mill, 35 parts of fume silica, 15 parts of diatomaceous earth, 7.5 parts of iron oxide, 2 parts of polytetrafluoroethylene and about 0.95 part of a dicumyl peroxide mixture containing 40% active ingredient on calcium carbonate. The polytetrafluoroethylene and the filler were added together in the form of a mixture. The resulting composition was easily formed into sheets which were cut and and molded into test slabs. In addition to the composition containing 2 parts of polytetrafluoroethylene, a composition was also made free of polytetrafluoroethylene that was tediously formed into tacky balls and these molded into test slabs. The test slabs from each composition were press-cured for 15 minutes at 300 to 350° F. and then post-cured for 16 hours at 400° F. Specimens representing each composition were cut from the respective slabs and these were then separately placed in A.S.T.M. MIL-7808 oil for 70 hours at 300° F. to measure resistance to surface reversion.

Table I shows the results obtained with slabs containing 2 parts of polytetrafluoroethylene per 100 parts of silicone polymer compared to slabs of polymer free of polytetrafluoroethylene. "Tacky" signifies that the composition convertible to the cured, solid, elastic state was difficult to process as it adhered to both mill rolls, and a tacky layer of silicone polymer mixture remained on the rolls after milling which had to be scraped to be removed. The letter "H" is hardness (Shore A), "T" is tensile (p.s.i.), and "E" is elongation (percent). Surface reversion is measured by removing a specimen from the oil, and wiping its surface with a dry, white cloth. Evidence of slight surface reversion is shown by the deposition of small amounts of elastomer on the cloth which can be readily detected by the red color of the iron oxide present in the elastomer. Severe surface reversion is evidenced by the transfer of substantial amounts of elastomer to the surface of the cloth because the surface of the elastomer is fluid instead of elastomeric.

*Table I*

| Polytetra-fluoroethylene in Parts per 100 of Copolymer | Tacky | Press-Cured 350° F./15 Min. | | | Post-Cured 400° F./16 Hrs. | | | MIL-7808/ 10 Hrs./300° F. |
|---|---|---|---|---|---|---|---|---|
| | | H | T | E | H | T | E | |
| 2 | No | 62 | 624 | 167 | 72 | 700 | 90 | Slight Surface Reversion. |
| 0 | Yes | 58 | 572 | 100 | 71 | 690 | 75 | Severe Surface Reversion. |

The above data show that the compositions containing polytetrafluoroethylene possess improved properties. Prior to cure, for example, the compositions were readily shaped, and were easily removed from the surface of the processing equipment. After cure, the compositions containing polytetrafluoroethylene exhibited improved tensile strength and resistance to surface reversion.

EXAMPLE 2

A composition was made in accordance with the procedure of Example 1, except that the silicone polymer utilized was composed of about 60 mole percent of dimethylsiloxy units chemically combined with 40 mole percent of methyl-gamma-cyanopropylsiloxy units and 0.1 mole percent of dimethylvinylsiloxy units. Slabs were made from compositions containing 100 parts of the silicone polymer, 40 parts of fume silica, and 0.9 part of benzoyl peroxide blended respectively with 2, 4 and 6 parts of polytetrafluoroethylene. A control which was free of polytetrafluoroethylene was also made which was in the form of a tacky ball. The test slabs were cured for 15 minutes at 270° F. The slabs were post-cured for 16 hours at 300° F. Table II shows the results obtained when the various compositions were milled with respect to tackiness, and cured with respect to physical properties, where the terms employed are the same as in Table I.

Table II

| Polytetrafluoroethylene in Parts per 100 Parts Copolymer | Tacky | Cured 270° F./15 Min. and 16 Hrs./300° F. | | |
|---|---|---|---|---|
| | | H | T | E |
| 0 | Yes | 76 | 759 | 130 |
| 2 | No | 77 | 730 | 150 |
| 4 | No | 76 | 845 | 200 |
| 6 | No | | | |

Table II shows that an improvement in tensile strength is obtained when the parts of polytetrafluoroethylene per 100 parts of copolymer are increased.

EXAMPLE 3

An organopolysiloxane composition convertible to the cured, solid, elastic state is prepared in accordance with the procedure of Example 1, by milling a mixture of 100 parts of silicone polymer consisting of 3 moles of methyl-β-cyanoethylsiloxane units chemically combined with 97 moles of dimethylsiloxane units, 2 parts of polytetrafluoroethylene, 40 parts of fume silica, and 1.6 parts benzoyl peroxide. It is found that prior to the addition of the polytetrafluoroethylene to the mixture, the mixture is tacky. The tackiness of the mixture is substantially reduced as soon as the polytetrafluoroethylene is incorporated. Slabs are prepared from the organopolysiloxane compositions and cured at 276° F. for 15 minutes and 16 hours at 300 °F. It is found that the physical properties of these slabs are substantially the same as the physical properties obtained from slabs made from the same silicone polymer free of polytetrafluoroethylene and cured by the same procedure.

While the foregoing examples have of necessity been limited to only a few of the very many variables within the scope of the present invention, it should be understood that the present invention covers a much broader class of organopolysiloxane compositions comprising copolymers of Formula 1 consisting of chemically combined organocyanoalkoxysiloxy units and diorganosiloxy units, polytetrafluoroethylene, and filler. These novel materials can be prepared by methods specifically illustrated in the above examples and described further in the foregoing description of the present invention.

What I claim as new and desire to secure by Letters Patent of the United States is:

1. A composition comprising by weight, (A) 100 parts of polymer having a viscosity of at least 100,000 centipoises at 25° C. and consisting essentially of chemically combined units of the formula

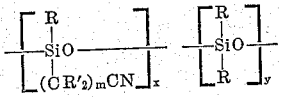

(B) from 0.1 to 10 parts of powdered polytetrafluoroethylene, and (C) from 10 to 200 parts of a member selected from the class consisting of reinforcing filler and semireinforcing filler, where the sum of $x$ and $y$ is greater than 1,000, and $x/y$ has a value greater than 0.01, R is a member selected from the class consisting of monovalent hydrocarbon radicals and halogenated monovalent hydrocarbon radicals, R' is a member selected from the class consisting of hydrogen and alkyl radicals having from 1 to 8 carbon atoms, and $m$ is an integer equal to from 2 to 5, inclusive.

2. A composition comprising by weight, (A) 100 parts of a polymer having a viscosity of at least 100,000 centipoises at 25° C., and consisting essentially of chemically combined methyl-β-cyanoethylsiloxy units and dimethylsiloxy units, where there is present in said polymer at least 1 mole percent of methyl-β-cyanoethylsiloxy units, (B) from 1 to 4 parts of powdered polytetrafluoroethylene, and (C) from 10 to 50 parts of fume silica.

3. A composition comprising by weight, (A) 100 parts of a polymer composed of chemically combined methyl-gamma-cyanopropylsiloxy units, dimethylsiloxy units and dimethylvinylsiloxy units, in a proportion of from about 5 to 60 moles of methyl-gamma-cyanopropylsiloxy units, from about 94.5 to 39.999 moles of dimethylsiloxy units and about 0.001 to 0.5 moles of dimethylvinylsiloxy units, per 100 moles of chemically combined units in said polymer, (B) 1 to 2 parts of powdered polytetrafluoroethylene, and (C) 35 to 40 parts of fume silica.

References Cited in the file of this patent
UNITED STATES PATENTS 2,644,802    Lontz    July 7, 1953
2,710,290    Safford et al.    June 7, 1955